United States Patent [19]
Powell

[11] Patent Number: 5,636,658
[45] Date of Patent: Jun. 10, 1997

[54] HIGH FLOW REED VALVE

[76] Inventor: William F. Powell, 2009 Wildhorse La. P.O. Box 535, Big Bear City, Calif. 92314

[21] Appl. No.: 378,238

[22] Filed: Jan. 24, 1995

[51] Int. Cl.⁶ .................................................. F16K 15/16
[52] U.S. Cl. ..................... 137/512.1; 137/855; 123/73 V
[58] Field of Search ............................. 137/512.1, 855, 137/856; 123/73 V

[56] References Cited

U.S. PATENT DOCUMENTS

| | | | |
|---|---|---|---|
| 3,690,304 | 9/1972 | Schneider | 123/73 V |
| 3,905,340 | 9/1975 | Boyesen | 123/73 A |
| 3,905,341 | 9/1975 | Boyesen | 123/73 A |
| 4,051,820 | 10/1977 | Boyesen | 123/73 A |
| 4,228,770 | 10/1980 | Boyesen | 123/73 V |
| 4,235,206 | 11/1980 | Boyesen | 123/73 V |
| 4,294,202 | 10/1981 | Boyesen | 123/73 PP |
| 4,474,145 | 10/1984 | Boyesen | 123/73 PP |
| 4,633,825 | 1/1987 | Flaig | 137/856 X |
| 4,643,139 | 2/1987 | Hargreaves | 123/73 V X |
| 4,690,107 | 9/1987 | Emler | 123/73 V |
| 4,879,976 | 11/1989 | Boyesen | 123/651 |
| 5,103,867 | 4/1992 | Wu | 137/601 |
| 5,176,170 | 1/1993 | Boyesen | 137/855 X |
| 5,245,956 | 9/1993 | Martin | 123/73 V |
| 5,247,912 | 9/1993 | Boyesen | 137/855 X |

*Primary Examiner*—John Rivell

[57] ABSTRACT

A high flow one-way or reed valve mechanism for use in the air/fuel supply system of an internal combustion engine. The reed valve comprising of a reed cage, reed cage ports, and reeds. The reed cage containing two converging main walls and two end walls. Each main wall is afforded multiple width wise reed cage ports. Each reed cage port is covered with a flexible reed. The high flow reed valve is designed to deliver large air/fuel flows into the cylinder of an engine while eliminating detrimental back flow and pressure fluctuations into the air/fuel supply source.

4 Claims, 5 Drawing Sheets

HIGH FLOW REED VALVE

BACKGROUND—Field of the Invention

This invention relates to a one-way or reed valve for two stroke engines, more specifically to a high flow reed valve designed to significantly increase air and fuel flow into a two stroke engine thereby greatly increasing horsepower.

BACKGROUND—Discussion of Prior Art

It is common knowledge in the engine design field that an increase in air and fuel flow to the combustion chamber of an internal combustion engine results in an increase in overall horsepower. Air and fuel are drawn into the two stroke engine as the up stroke of the piston creates a low pressure inside the crankcase, reed cage, and carburetor. This being accomplished during the engines intake cycle. During the down stroke of the piston, a high pressure is created in the crankcase and air and fuel flow through transfer ports to the combustion chamber. A one-way inlet valve (or reed valve) is situated immediately downstream of the carburetor. The reed valve is designed to open under the low pressure of the intake cycle and allow air and fuel to enter the crankcase. This same reed valve then closes during the down stroke of the piston from the high pressures that are a result of piston displacement. This stops a counter-productive back flow of air and fuel upstream and back through the carburetor. This back flow has two main disadvantages. First, in any air/fuel intake system there is a given amount of air/fuel that can flow into an engine on any one intake cycle. When no reed valve is present, air and fuel back flow upstream and back through the air/fuel metering device (carburetor). Consequently, this air and fuel cannot be delivered to the crankcase and cannot be used as part of the air/fuel charge. This decrease in air/fuel delivered to the combustion chamber results in a marked decrease in horsepower. Secondly, this air/fuel back flow causes major pressure and velocity variations within the carburetor. These pressure variations decrease the carburetors ability to properly regulate air/fuel flow thereby causing an inconsistent fuel charge to be delivered to the crankcase and ultimately to the combustion chamber decreasing consistent usable horsepower.

A typical reed cage or one-way valve includes two converging obliquely inclined main walls that meet at an apex, creating a V-shaped pattern. Connected to the outer edges of the V-shaped main walls on either side is an end wall. These end walls are configured parallel to each other and perpendicular to the main walls. The apex of the converging main walls being placed downstream. The wide mouth portion of the V-shaped device is placed in the upstream direction. The main wall of the reed cage having width and length. The width of the main wall running from an end wall to the other end wall. The length of the main wall extending from the cage apex point to the wide mouth portion of the v-shaped device. One or both converging main walls are afforded with a hole or port area that communicates with the engines internal air/fuel passages. These ports are covered on the exterior (downstream side of the main wall) with a flexible thin piece of epoxy-type resin and glass fiber material called a reed. These reeds can be constructed from a variety of materials such as composites, phenolics, and plastics. One side of this reed is anchored at the upstream end of the exterior surface of the main wall. The downstream end of the reed is left unattached as to allow for the reed to open when the pressure in the upstream side of the reed becomes greater than the pressure on the downstream side. The reed conversely closes when the pressure on the downstream side of the reed becomes greater than the pressure on the upstream side. This allows for air/fuel to enter the engine but stops back flow and pressure variations into the carburetor.

Numerous one-way or reed valves have been developed for use in the two-stroke engine. The following are the most pertinent reed valve and/or one-way valve patents known to the applicant. This art clearly illustrates the novelty of the applicant's improved invention.

| | |
|---|---|
| 3,905,340 Boyesen | 4,235,206 Boyesen |
| 3,905,341 Boyesen | 4,474,145 Boyesen |
| 4,051,820 Boyesen | 4,690,107 Emler |
| 4,228,770 Boyesen | 4,879,976 Boyesen |
| 4,294,202 Boyesen | 5,103,867 Wu |

The Boyesen patents disclose a reed valve mechanism for use in the air/fuel supply system of an internal combustion engine. They include passages, ports, and reeds, all of which are arranged to minimize fluctuations of the flow velocity of the air/fuel being delivered to the cylinder of an engine.

The Emler patent discloses a flow enhancer for reed inlet valves. The flow enhancing insert is positioned in the carburetor side of the reed valve inlet frame of a two-cycle internal combustion engine.

The Wu patent discloses a reed valve for a fluid passage. It includes a sealing means which sealingly fixed to the passage walls, and a primary petal seat having a primary seat port and a downstream primary seat end. A flexible primary petal is sealingly attached to the primary petal seat in a cantilevered technique. A primary baffle is spaced apart from the primary petal seat. A positioning means enables the primary baffle to sealingly engage the primary petal seat wherein fluid(s) flow between the primary baffle and the petal seat is directed by the primary baffle toward the primary seat port.

Reed valves are limited in the amount of air/fuel they can flow by a number of factors including flow tip area, cage angle, reed length, size, thickness, and weight. Prior art demonstrates deficiencies in many or all of these areas causing substantial flow restriction and an unnecessary decrease in horsepower.

A. Flow tip area being defined as the area at the downstream and unattached end of the reed that allows air and fuel to pass through the reed cage ports and communicate with the engines internal fuel passages. Prior art sometimes refers to flow tip area as cross sectional intake flow area. The reed opens at the flow tip area when the pressure at the upstream side of the reed valve is greater than the pressure at the downstream side. The reed conversely closes when the pressure at the downstream side of the reed is greater than the pressure presented on the upstream side. A reed valve is severely limited by flow tip area. That is that any given opening (flow tip area) can only flow a given amount of air and fuel; therefore, any reed valve or combination of reed valves are limited in their flow capabilities by the total area of opening (flow tip area). Prior art situates their ports in a singular horizontal (width wise) plane in relation to the two converging main walls. This severely limits Boyesen and Wu's flow tip area, air/fuel flow, and ultimately their usable horsepower.

Boyesen and Wu's limited flow tip area requires air and fuel to pass through the reed cage ports at a very high velocity (speed) to enable theses devices to deliver an adequate amount of air/fuel to the combustion chamber. It is well known in the aerodynamic field that any increase in velocity is accompanied by an exponential increase in drag (unnecessary energy loss); therefore, the high velocities required to deliver adequate air/fuel flow through a limited flow tip area causes a great deal of drag and unnecessary energy loss. This once again limits air and fuel flow to the engine and causes a decrease in horsepower.

Another problem with high air and fuel velocities passing through a limited flow tip area, is that the higher air/fuel velocity, the more likely the reeds will oscillate (vibrate independent of proper pressure fluctuations in the reed cage). This oscillation causes the reeds to remain open when they should be closed and be closed when they should be open. This allows air and fuel to back flow into the carburetor creating a massive decrease in air and fuel flow to the engine. This once again results in a decrease in usable horsepower.

B. For a reed valve to operate properly, the reeds must be able to open and close at a rate relative to engine r.p.m. The more mass (weight) a reed contains, the more energy it will take to cause the reed to change directions. As engine r.p.m. increases, reeds with a large mass cannot change directions rapidly enough to compensate for the increased revolutions. This causes the reeds to remain open when they should be closed, decreasing air/fuel flow and ultimately horsepower. As you can see in Boyesen and Wu, the reed length is necessarily long. This increases mass and creates the above noted problems.

C. Boyesen and Wu utilize vertically positioned (length wise) port dividing walls (interior upstream walls that divide reed ports into separate vertical or length wise sections). The use of port dividing walls creates two inherent problems. First, any time you utilize a port dividing wall, you reduce total usable flow tip area, i.e., where a port dividing wall is present, air/fuel cannot flow across the flow tip area. Port dividing walls also create parasitic drag (skin friction drag) and induce local and downstream vortices, causing an overall decrease in air/fuel delivery. Port dividing walls also decrease the total surface area of the reeds exposed to upstream opening pressure. The less surface area of the reeds exposed to an upstream pressure differential, the slower the reeds will open. This decreases the total amount of time the reed is in the open position; therefore, a decrease in total air/fuel flow.

This decrease in exposed surface area and slowed reed opening time, causes the reed valve to be less responsive to r.p.m. changes and be less effective at high r.p.m. ranges.

D. Wu and Boyesen have also demonstrated a two-stroke engine with multiple reed cages (Boyesen) or multiple reeds and baffles (Wu) in an attempt to increase flow tip area. This may or may not increase air/fuel flow due to the basic theory that as the internal cubic area of a flow device is increased the pressure of the gas flowing through it is greatly decreased; therefore, you could reasonably deduct that air/fuel flow will not significantly increase by adding additional reed cages or reeds and baffles due to a marked decrease in flow pressure. It is also evident that as each reed valve (Boyesen) or reed and baffle set (Wu) is taken on its own individual merit, it is subject to all of the above noted limitations and can be substantially improved upon as described below.

OBJECT AND ADVANTAGES

Accordingly, several objects and advantages of applicant's improved invention are as follows. These objects and advantages clearly show the novelty of the applicant's invention over prior art.

The improved reed valve or plate member is designed with two opposed converging obliquely inclined main or central walls. These main walls meet and form an apex at the downstream end of the valve. There are two end walls that are located at each side of the converging main walls. These end walls run parallel to each other and perpendicular to the main walls. The end walls serve to enclose the reed valve. The apex of the reed valve is positioned downstream and the wide-mouth portion of the reed valve is positioned upstream. Located on each of the main walls are two completely separate, full width, horizontally (width wise) positioned reed cage ports or apertures. One reed cage port is located just downstream of the most upstream port or aperture. All reed cage ports on each main wall freely communicate with the engines internal fuel passages. Each of these ports is covered on the downstream (exterior) side of the main walls with a thin flexible high performance plastic or composite material. This plastic or composite material, also called a reed, is attached to the reed cage at the reed's upstream end. The downstream end of the reed is left unattached as to allow for reed movement. These reeds serve to properly open and close with appropriate pressure differentials caused by piston displacement. This opening and closing serves to allow air/fuel to flow to the crankcase and then to the combustion chamber while greatly reducing unnecessary back flow. This multiple horizontal (width wise) porting configuration has many advantages.

A. This improved device greatly increases and routinely doubles flow tip area. As discussed earlier, flow tip area is directly related to air/fuel flow. The more flow tip area, the more air/fuel that can flow through the reed valve. With an increase in flow tip area, the air/fuel can flow at a lower velocity and still deliver a much higher air/fuel flow to the crankcase and combustion chamber. This reduction in air/fuel velocity creates an exponential decrease in overall drag and once again creates an overall increase in air/fuel flow to the combustion chamber. Lower air/fuel velocities also greatly decreases the probability of reed oscillation (reed vibration independent of pressure variations in the reed valve) and therefore greatly decrease the chance of large air/fuel flow losses associated with reed oscillation and back flow.

B. Due to the multiple horizontal (width wise) port configuration, the reeds can be made with a significant decrease in overall mass (weight). The less mass, the less energy it takes to change the reeds direction; therefore, the reeds can change directions easily and rapidly allowing for a much greater response to radical r.p.m. changes and high r.p.m. ranges. This decrease in mass prevents the reed from being open when it should be closed and once again decreases the chances of major air/fuel losses associated with back flow. This decrease in mass allows the reeds to open further with the same given upstream pressure presented upon them. The farther a reed can open, the less drag it creates and the more air/fuel it can ultimately flow.

C. The high flow reed valve is designed free of port dividing walls. This increases flow tip area and totally eliminates dividing wall parasitic drag. Obviously, an increase in flow tip area and a decrease in parasitic drag, greatly increases air/fuel flow and usable horsepower.

The absence of port dividing walls also allows the reeds to have more upstream surface area exposed to upstream pressure differentials. This allows for the reeds to open faster and respond to r.p.m. changes and high r.p.m. ranges more effectively.

Further objects and advantages of the applicant's invention will become apparent from consideration of the drawings and description contained herein.

DESCRIPTION OF DRAWINGS

All drawings and descriptions contained in this application refer to the reed valve as it is commonly placed in the engine with the main walls in a relative horizontal position and the end walls being placed in a relative vertical position.

REFERENCE NUMERALS IN DRAWINGS

10 Cylinder/Crankcase Mounting Plate
12 Non-Threaded Openings in Cylinder/Crankcase Mounting Plate
14 Threaded Openings for Valve Pedal Mounting Bolts
16 Reed Retaining Strips
18 Reed Retaining Strip Holes
20 Reed Mounting Bolts
22 Reeds
24 Reed Cage Ports or Apertures
26A Main Wall Surface
26B Main Wall Surface
26C Main Wall Surface
28 Main Wall Step
30 End Wall
32 Cage Apex Point
34 Internal Upstream Wall
36 Upstream Air/Fuel Flow
38 Downstream Air/Fuel Flow
40 Carburetor Mounting Boot

DETAILED DESCRIPTION OF FIGS. 1 TO 5

Figure 1:
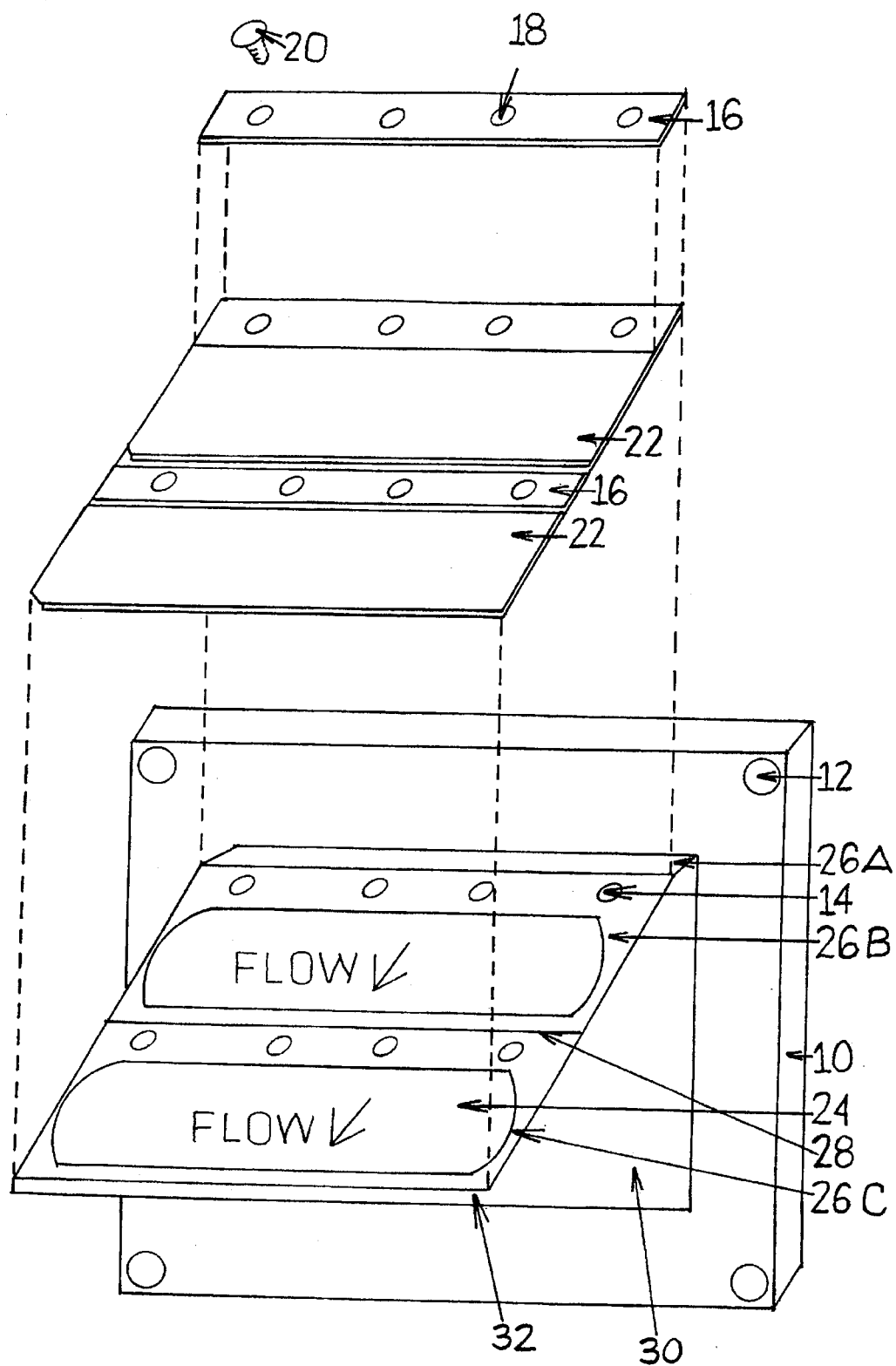
FIG. 1 is a perspective view of one embodiment of applicant's improved device. This drawing is illustrated with the reeds separated from the reed cage to demonstrate the internal porting of the high flow device.
Figure 2:
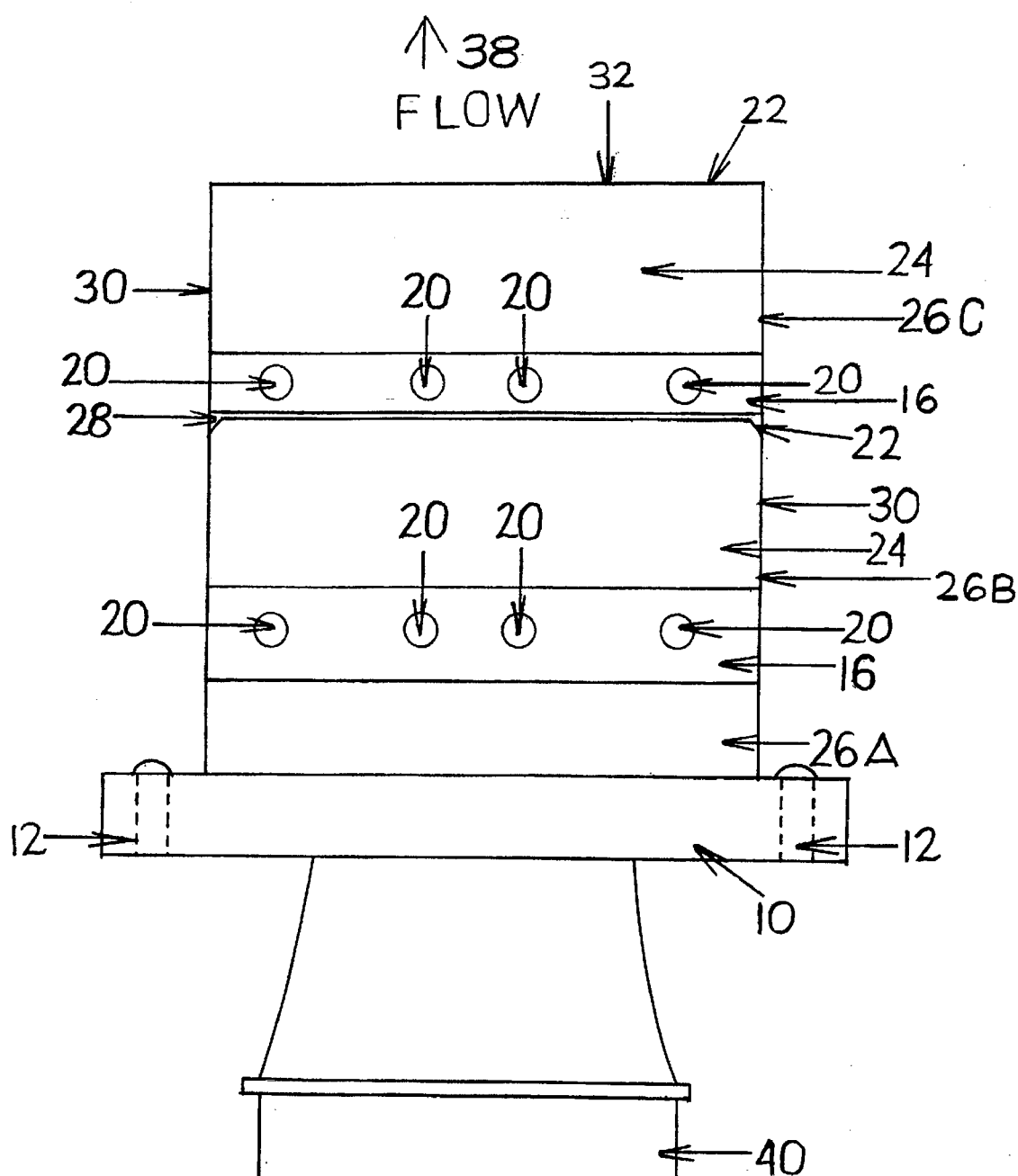
FIG. 2 is a view looking down onto one of the main walls. This Figure is illustrated with the device in the horizontal position and demonstrates the superior dual horizontal widthwise port configuration, small overall reed size, and increased flow tip area.
Figure 3:
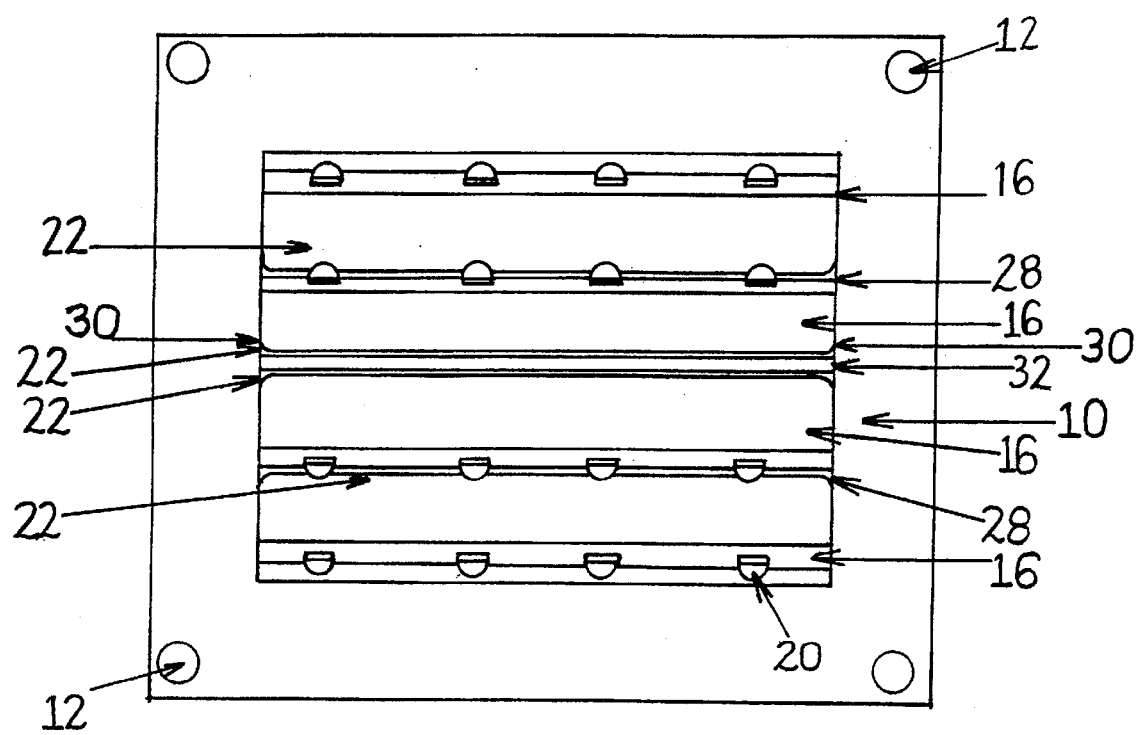
FIG. 3 is illustrated from the downstream (apex) end of the improved device, again demonstrating the superior design of the applicant's invention.
Figure 4:
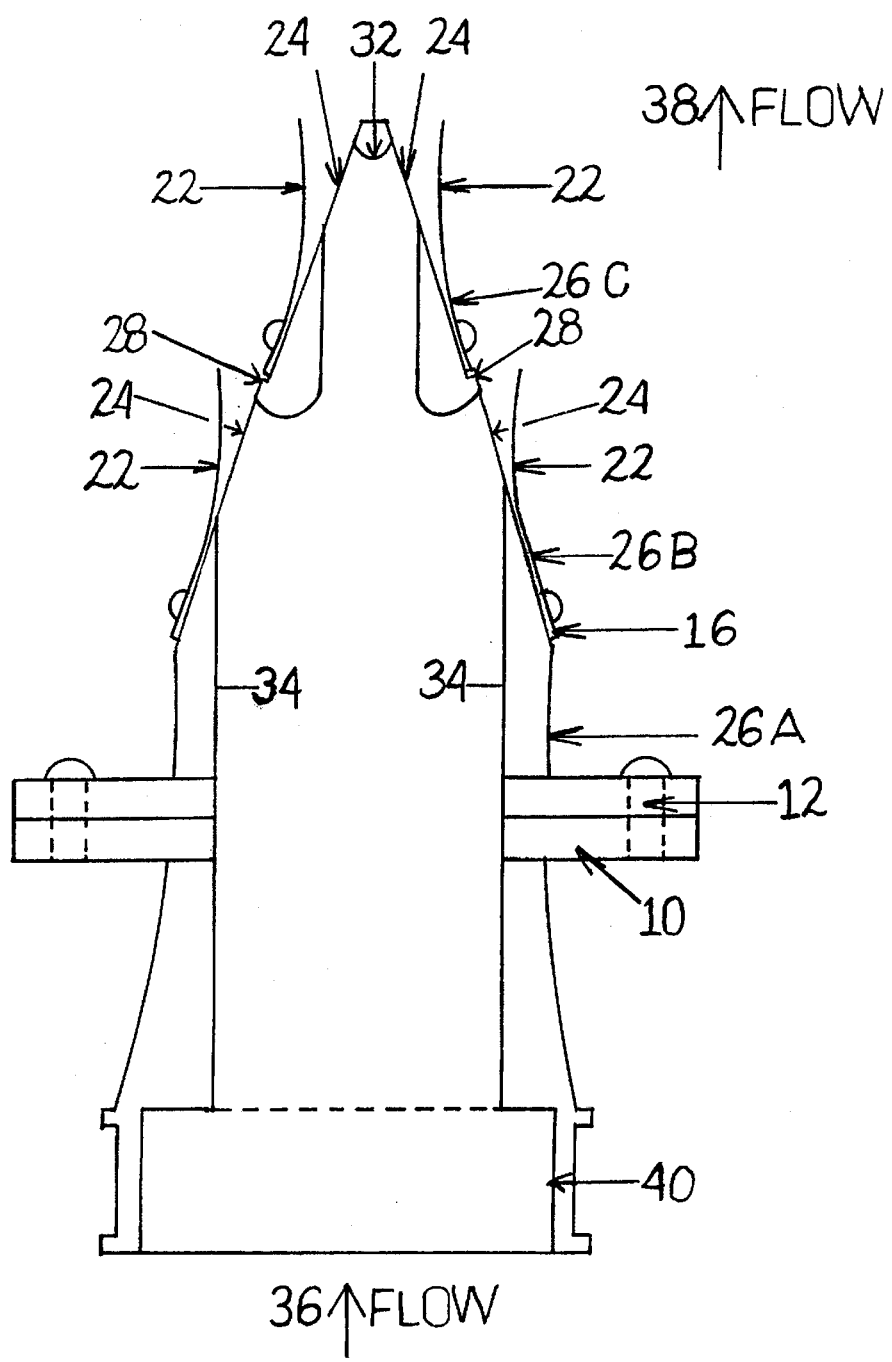
FIG. 4 is a section thru view illustrated from one of the end walls. This view again demonstrates the dual horizontal port configuration, increased flow tip area, and small overall reed size. The reeds are illustrated in the open position. This view is shown to demonstrate the internal configuration of the high flow reed valve.
Figure 5:
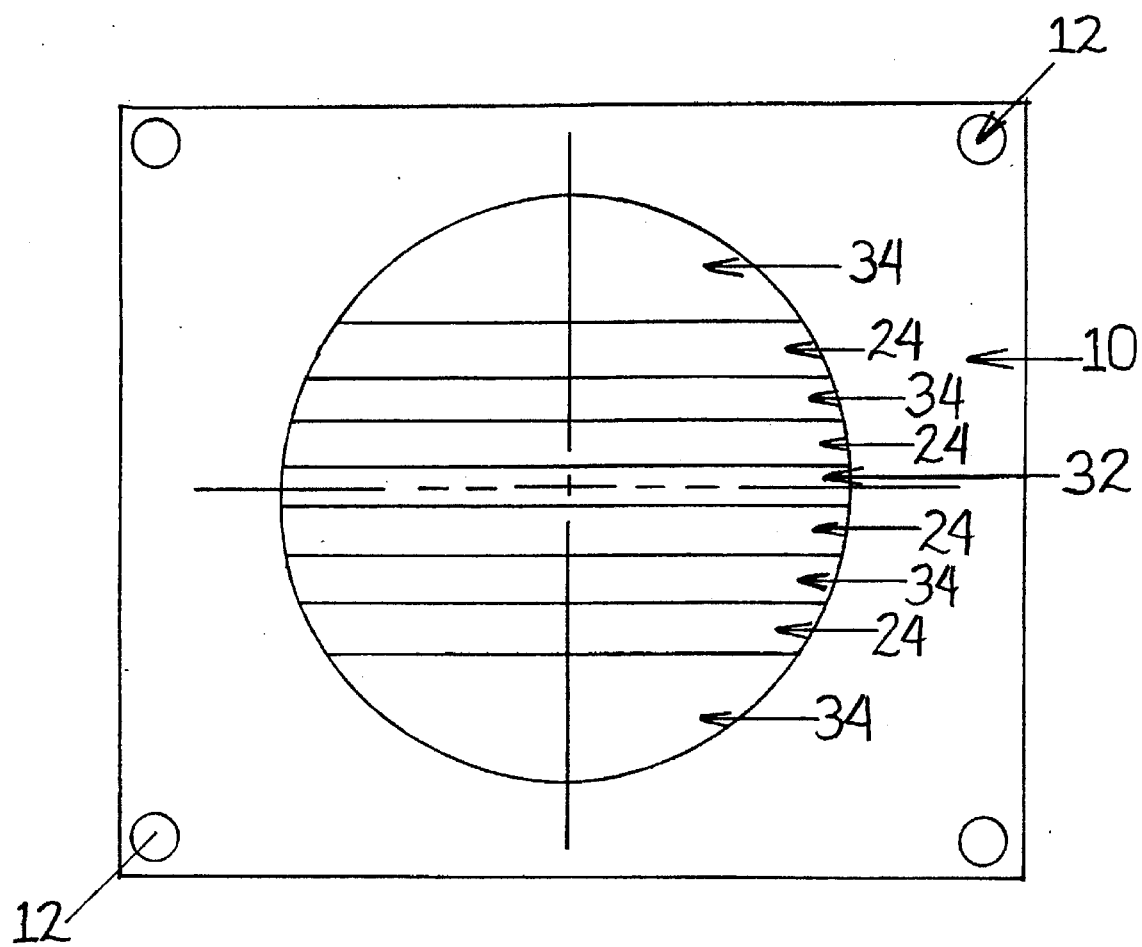
FIG. 5 is a view from the upstream (wide mouth) end of the improved device. This view shows the internal (upstream) end of the reed cage. This view is illustrated as if you are looking down the carburetor into the device.

As seen in all Figures, upstream in indicated by the number 36 and downstream is indicated by the number 38. There is also an arrow indicating air/fuel flow in all drawings except FIG. 3 and 5, as these Figures are an upstream and downstream, respectively. The internal workings, components, and operation of a two-stroke engine are not shown or described as these items are common knowledge to those skilled in the art. It should be noted that the wide mouth upstream 36 portion of the reed cage is just downstream 38 of the fuel supply source (carburetor). The cage apex point 32 or narrow converging section is located just upstream 36 of the cylinder/crankcase and piston.

The improved reed valve or plate member is V-shaped and designed with two converging, obliquely inclined and opposed main walls 26. These main walls 26 meet at the downstream 38 end of the valve at cage apex point 32. There are two end walls 30 that are located at each end of the main walls 26. These end walls 30 run parallel to each other and perpendicular to the main walls 26. These end walls 30 serve to enclose the reed valve. Located on each of the main walls 26 are two completely separate, full length, horizontally (width wise) positioned reed cage ports 24 (apertures). One reed cage port 24 is positioned just downstream of the other port 24. Each of these ports is covered on the downstream exterior side of the main wall with a flexible high performance glass/epoxy material known as a reed 22. This application shall not be limited by material selection. These reeds 22 have a high modulus of elasticity and are virtually indestructible under normal engine operating temperatures. The reeds 22 have a thickness of 0.010" to about 0.020". The reeds 22 serve to regulate air/fuel flow by opening and closing at the downstream 36, unattached, free floating end of the reed. This occurs when the reeds are exposed to upstream and downstream pressure differentials caused by piston displacement. The reed cage ports 24 freely communicate with the engines internal fuel passages when the reeds 22 are in the open position. With the reeds 22 in the open position, air/fuel is allowed to flow from the carburetor through the reed cage port 24 into the crankcase then into the combustion chamber through transition ports and into the cylinder. The reeds then close from piston displacement pressure eliminating ineffective back flow patterns. These reeds 22 are attached at the upstream end via reed mounting bolts 20, these mounting bolts 20 fit into threaded holes 14 at the upstream end of the reed. There is also a long narrow metal strip 16 that runs along the upstream edge of all reeds 22. This reed retaining strip 16 is afforded with holes 18 to allow the reed mounting bolts 20 to pass through this retaining strip 16. Reed retaining strip 16 is utilized to provide support and stability to the reeds 22. At the upstream end of the reed valve there is provided a plate 10 that serves to attach the reed valve to the cylinder or crankcase on the intake side of the engine. There are openings 12 provided in this mounting plate 10 to allow the cylinder studs to pass through the plate 10 as to allow for the reed valve to be attached to the intake side of the cylinder or crankcase. There is a circular rubber material (boot) 40 that is open at both ends attached to the upstream 36 end of the reed valve. This boot 40 serves to attach the carburetor to the upstream 36 end of the reed valve.

The main walls 26 are not flat. There are three connected surfaces on the downstream side of each main wall 26. First, there is surface 26A, which is placed width wise on the main wall and perpendicular to the cylinder mounting plate. This surface is upstream 36 of both reed cage ports. This surface continues downstream 38 until it reaches the most upstream 36 portion of the upstream 36 reed 22. The second surface, 26B, begins at the upstream end of the most upstream reed at an angle of approximately 200 degrees relative to surface 26A. Surface 26B continues downstream until it reaches main wall step down point 30. The step down to the third surface is approximately 0.035 of an inch. The third surface 26C continues at the same angle (relative to surface 26A) as surface 26B but at approximately 0.035 of an inch inferior (below) to surface 26B. Surface 26C continues downstream until it reaches cage apex point 32. Surface 26C is located inferior to surface 26B to allow for better air/fuel flow at the downstream side of the reed valve.

The internal upstream surfaces 34 of the main and end walls are designed with gradual surface transitions as to limit turbulent air/fuel flows. All internal surfaces are of gradual smooth contour including the internal surface of the cage apex. This serves to create laminar air/fuel flows and discourage turbulent vortices. This also allows for the air/fuel flow to reach and utilize the outer edges of the reed cage port that is commonly stagnant. There are no vertically positioned internal dividing walls contained in the improved reed cage, as these walls limit flow tip area and create unnecessary parasitic drag.

This embodiment of the applicant's reed valve is produced using a lost wax casting process. The device is made of T-4 aluminum. This application shall not be limited by material selection or mode of production.

Although the description above contains many specifications, these should not be construed or considered as limiting the scope of the applicant's invention; but, as merely providing illustrations of some of the presently preferred embodiments of this invention. For example, the reeds and reed cage can be made of different materials and configurations that achieve the same results. One example could be situating more than one (two, three, four or more) apertures or ports downstream of the most upstream port or aperture to again increase flow tip area. The reed cage could also be made of high performance plastic or composite materials.

Accordingly, the scope of this invention should be determined not by the embodiments illustrated, but the appended claims and their legal equivalents.

I claim:

1. A one way valve for use in an air and fuel supply passage of an internal combustion engine comprising a wall member means with multiple apertures passing therethrough, each aperture covered by a flexible closure means, said wall member means comprised of obliquely inclined walls, said apertures located in the obliquely inclined walls, at least one of said obliquely inclined walls contains a plurality of apertures, one or more of said apertures located downstream of a most upstream aperture, and means for attaching an upstream end of said flexible closure means to said obliquely inclined walls.

2. The one way valve of claim 1 including no internal lengthwise, parallel to axis of flow, positioned port dividing walls.

3. The one way valve of claim 1 including a downstream external surface on each of the opposed obliquely inclined walls having three connected surfaces, a first most upstream surface of said downstream external surface of each opposed obliquely inclined wall being positioned perpendicular to a cylinder/crankcase mounting plate second and third surfaces of said downstream external surface of said opposed obliquely inclined wall being positioned approximately 200 degrees relative to said most upstream portion of each opposed obliquely inclined wall, the second surface of said downstream surface of each opposed obliquely inclined wall extending from a most upstream flexible closure means and continues to a most upstream portion of a most downstream flexible closure means, the third surface of said downstream surface of each said opposed obliquely inclined wall extending from said most upstream portion of said most downstream flexible closure means to an apex.

4. The one way valve of claim 3 wherein said obliquely inclined walls form a V-shape with said apex placed downstream from said cylinder/crankcase mounting plate.

* * * * *